United States Patent [19]
Windsor

[11] 3,894,568
[45] July 15, 1975

[54] TREE HARVESTING APPARATUS

[75] Inventor: Robert H. Windsor, Brisbane, Australia

[73] Assignee: Eaton Yale Ltd., Canada

[22] Filed: Mar. 7, 1974

[21] Appl. No.: 449,044

[52] U.S. Cl. ............ 144/3 D; 144/2 Z; 144/309 AC
[51] Int. Cl. ............................................ B27c 9/00
[58] Field of Search ........ 144/2 Z, 3 D, 34 E, 34 R, 144/309 AC

[56] References Cited
UNITED STATES PATENTS

| | | | |
|---|---|---|---|
| 3,487,864 | 1/1970 | Larson et al. | 144/34 R X |
| 3,623,521 | 11/1971 | Shields | 144/3 D X |
| 3,643,711 | 2/1972 | Puna | 144/3 D X |
| 3,731,719 | 5/1973 | Pierrot et al. | 144/2 Z X |
| 3,732,904 | 5/1973 | Hamilton et al. | 144/2 Z X |
| 3,734,152 | 5/1973 | Shields | 144/2 Z X |

Primary Examiner—Andrew R. Juhasz
Assistant Examiner—W. D. Bray
Attorney, Agent, or Firm—Teagno & Toddy

[57] ABSTRACT

An improved tree harvesting apparatus includes a felling assembly for severing the trunk of a standing tree and positioning the tree trunk in a delimber assembly. The delimber assembly includes a delimber head mounted on a carriage which is movable along a boom upon operation of a drive motor. Upon initiation of outward movement of the delimber carriage along the boom, a motor is activated to move a plurality of delimber blades into engagement with the tree trunk. These delimber blades strip the branches from the trunk of the tree as the carriage and delimber head move outwardly along the boom. When the carriage reaches a topping position, operation of the carriage drive motor is automatically stopped. A pair of topping blades can then be moved inwardly to top or cut off an outer end portion of the tree trunk. As soon as the tree trunk has been topped, the carriage drive motor is automatically activated to move the delimber head further outwardly so that it is clear of the end of the topped tree trunk. The felling assembly is then actuated to deposit the topped and delimbed tree trunk in a bunk.

9 Claims, 10 Drawing Figures

TREE HARVESTING APPARATUS

BACKGROUND OF THE INVENTION

The present invention relates to a new and improved tree harvesting apparatus having a delimber assembly for removing the branches from the trunk of a tree and topping the delimbed tree trunk.

A known tree harvesting apparatus includes a delimber assembly having a delimber head which is movable outwardly along a boom to delimb the trunk of a felled tree. When the delimber head reaches an outermost position, a pair of topping blades are actuated to cut off or top the outer end portion of the tree trunk. The topped and delimbed tree trunk is then deposited in a bunk for conveyance to a suitable unloading location.

Difficulties may be encountered during the operation of this known tree harvesting apparatus due to a failure of an operator to move the delimber blades into engagement with the tree trunk upon initiation of movement of the delimber head relative to the tree trunk. Of course, this results in an incomplete stripping of the limbs from the tree trunk. In addition, operating difficulties may be encountered due to a failure of the operator to move the delimber head clear of the tree trunk after the tree trunk has been topped. In addition to these operating difficulties, the known tree harvesting apparatus is relatively expensive to fabricate.

SUMMARY OF THE PRESENT INVENTION

The present invention provides a new and improved tree harvesting apparatus having a control system with several features which may be used together or separately to facilitate the delimbing and topping of tree trunks. This control system automatically effects movement of delimbing blades into engagement with the trunk of a tree upon initiation of outward movement of a delimber carriage and head. In addition, the control system automatically interrupts outward movement of the delimber carriage and head when they reach a topping position. Upon actuation of topping blades to cut off an outer end of a delimbed tree trunk, the control system automatically effects movement of the delimber carriage and head outwardly to clear the tree trunk so that it can be moved out of the delimber assembly. The cost of fabricating the delimber head is advantageously reduced by the use of a single motor to move a plurality of delimber blades into engagement with the tree trunk upon initiation of outward movement of the delimber head.

Accordingly, it is an object of this invention to provide a new and improved tree harvesting apparatus which is both economical to fabricate and relatively easy to operate.

Another object of this invention is to provide a new and improved tree harvesting apparatus having a delimber head with a plurality of delimbing blades which are automatically moved into engagement with a tree trunk upon initiation of outward movement of the delimber head.

Another object of this invention is to provide a new and improved tree harvesting apparatus which automatically effects outward movement of a delimber head after topping of a delimbed tree trunk to thereby move the delimber head clear of the tree trunk.

Another object of this invention is to provide a new and improved tree harvesting apparatus which includes a delimber head having a single motor to move a plurality of delimber blades into engagement with a tree trunk.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

A tree harvesting apparatus 20 (FIG. 1) constructed in accordance with the present invention includes a felling assembly 22 which is operable to sever the trunk of a standing tree and position the felled tree in a delimber assembly 24. The delimber assembly 24 is mounted on an articulated vehicle 26 having a trailing or rearward end portion 28 which is connected with a front or leading end portion 30 at a pivot connection 32. After the severed tree trunk has been delimbed and topped by the delimber assembly 24, it is deposited in a bunk 36 which is mounted on the front end of the vehicle 26 with an operator's cab or compartment 38 (FIG. 2).

The felling assembly 22 includes a felling head 42 having shears 44 for severing the trunk of a standing tree. When a standing tree is to be felled, the felling head 42 is moved to the position shown in dashed lines in FIG. 1 and in solid lines in FIG. 2. Clamp arms 46 are then closed to grip the tree trunk and the shears 44 are actuated. An articulated boom 50 is then operated from the extended position shown in dashed lines in FIG. 1 to the retracted position shown in solid lines in FIG. 1 to position a felled tree trunk 52 in engagement with a delimber head 54 in the manner illustrated schematically in FIG. 8. The construction of the feller head 42 and articulated boom 50 are the same as is disclosed in U.S. patent application Ser. No. 449,045, filed Mar. 7, 1974 by Robert N. Windsor and entitled "Tree Harvesting Apparatus" and will not be further described herein to avoid prolixity of description.

Figure 3:
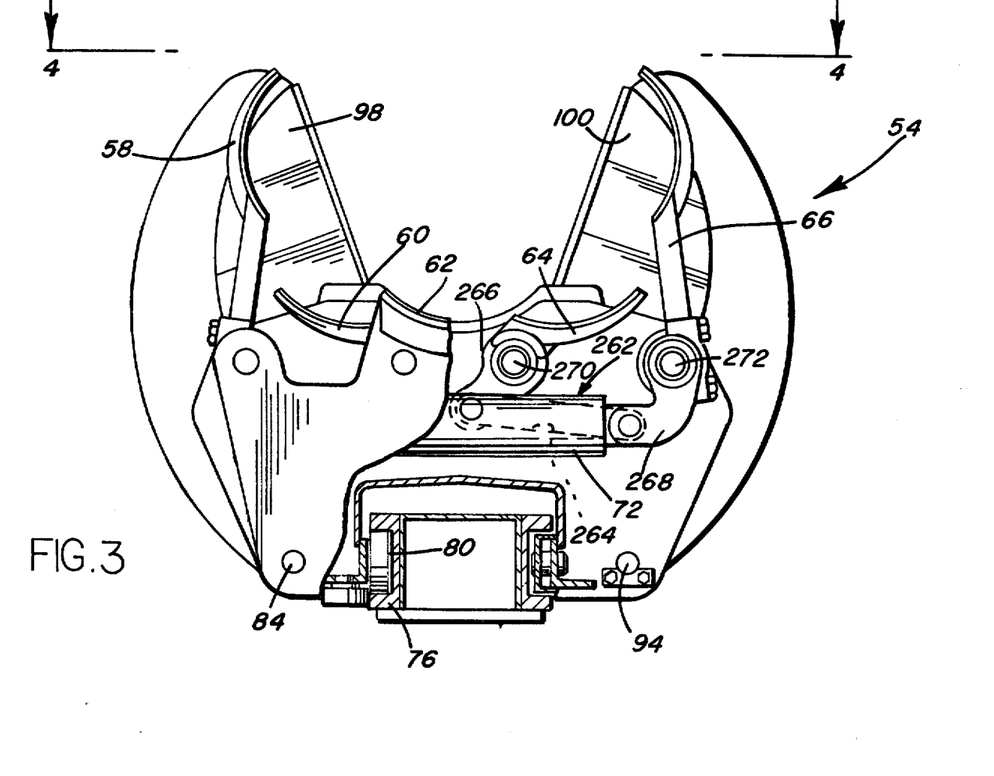
FIG. 3 is an enlarged sectional view, taken generally along the line 3—3 of FIG. 1, illustrating the relationship between a plurality of delimbing blades and topping blades in a delimber head.
Figure 4:
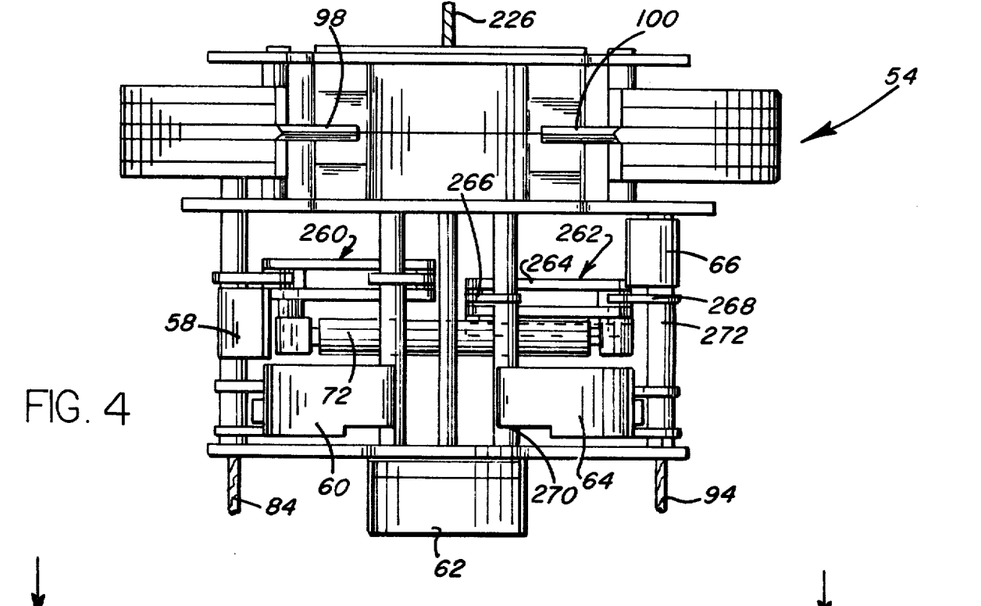
FIG. 4 is a plan view, taken generally along the line 4—4 of FIG. 3, further illustrating the construction of the delimber head.

The delimber head 54 includes a plurality of delimbing blades 58, 60, 62, 64, and 66 (see FIGS. 3 and 4). The movable blades 58, 60, 64 and 66 are pivoted from an inactive condition (illustrated in solid lines in FIG. 6) to an active condition (illustrated in dashed lines in FIG. 6) under the influence of a single piston and cylinder type motor 72 upon operation of the motor to an extended condition against the influence of a biasing spring.

Figure 5:
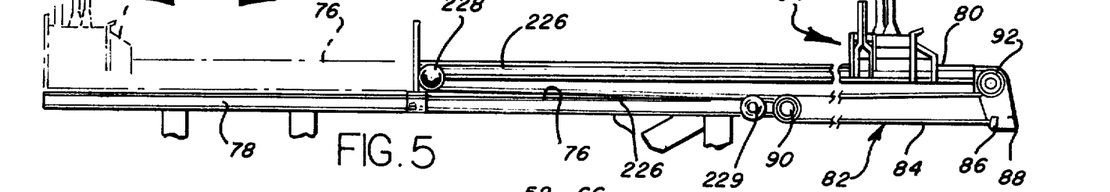
FIG. 5 is a somewhat schematized illustration of the manner in which the delimber head is moved outwardly from an initial position to a topping position upon movement of a carriage relative to a boom.

After the delimber blades engage the tree trunk 52, the delimber head 54 is moved outwardly to strip the limbs or branches from the tree trunk. This is accomplished by moving a delimber carriage 76 axially outwardly along a delimber boom 78 from an initial position (see FIGS. 1 and 8) to a topping position (see FIGS. 5 and 9).

During this outward movement of the carriage 76, the delimber head 54 is moved outwardly along a longitudinally extending guide track 80 on the carriage 76 to a delimber head drive arrangement 82. The delimber head drive arrangement 82 includes a cable 84 which is fixedly connected at one end 86 to an outer end 88 of the carriage 76. The cable 84 extends around a sheave or pulley 90 which is rotatably mounted on the boom 78 to a second pulley or sheave 92 mounted on the outer end of the carriage 76. An inner end portion of the cable 84 is fixedly connected to the delimber head 54 which is slidably mounted on the carriage 76. A second cable 94 (FIG. 4) extends around pulleys (not shown) and is connected with the delimber head 54 and carriage 76 in the same manner as the cable 84. Therefore, upon operation of a carriage drive motor 96 from the retracted condition of FIG. 8 to the partially extended condition of FIG. 9, the cables 84 and 94 pull the delimber head 54 outwardly along the carriage 76 as the carriage is moved outwardly along the boom 78.

Figure 9:
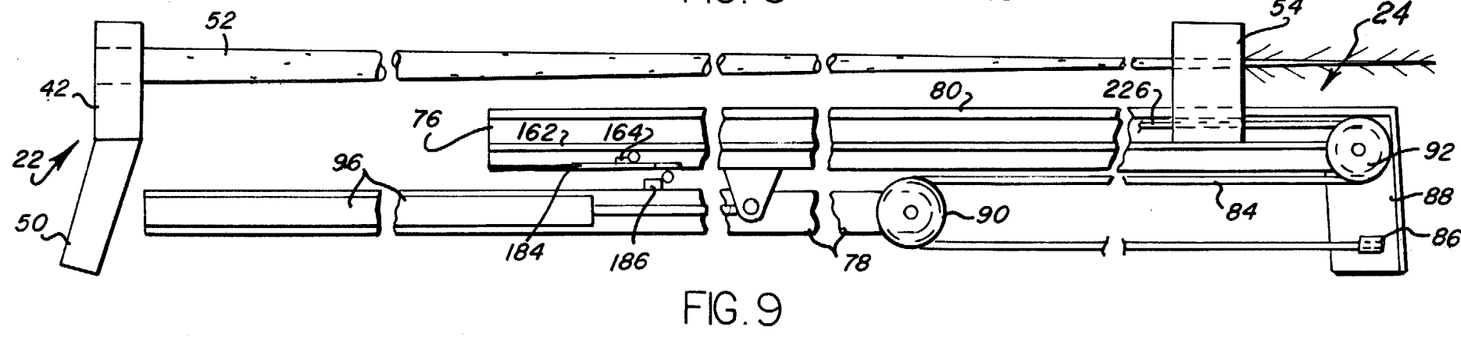
FIG. 9 is a schematic illustration depicting the relationship between the delimber head, carriage, and boom when the delimber head is in a topping position.
Figure 10:
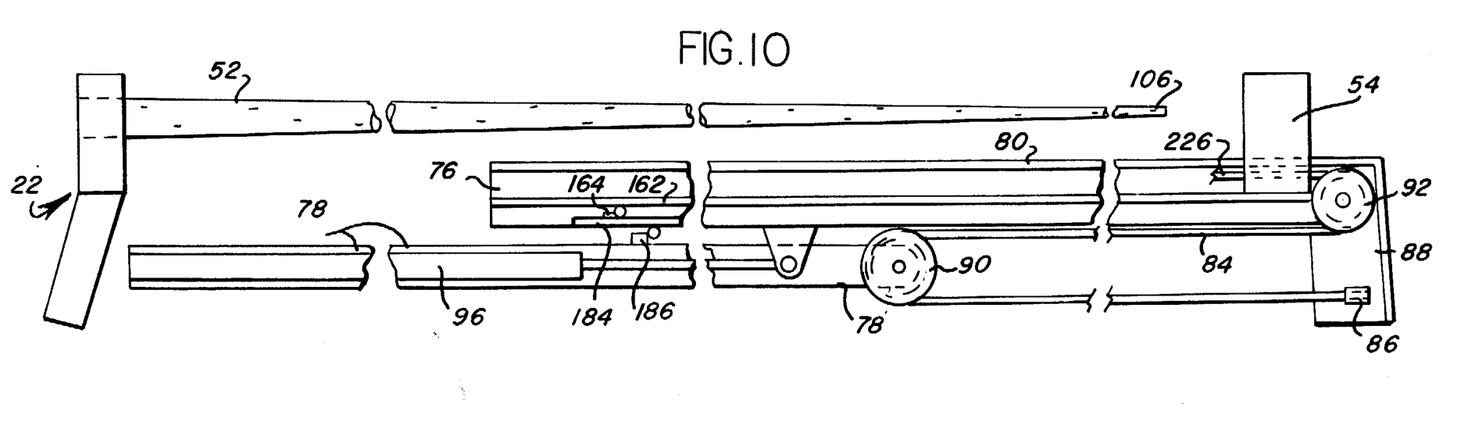
FIG. 10 is a schematic illustration depicting the relationship between the delimber head, carriage, and boom when the delimber head is in an extended or transfer position clear of the topped and delimbed tree trunk.

When the carriage 76 has been moved to the topping position of FIG. 9, operation of the drive motor 96 is interrupted and topping blades or shears 98 and 100 are moved toward each other from the open condition of FIG. 3 by a motor 104 (FIG. 7) to cut off or top the end of the tree trunk 52. The carriage drive motor 96 is then reactivated to move the delimber head 54 clear of the delimbed and topped tree trunk 52. Thus, the carriage drive motor 96 is extended from the position shown in FIG. 9 to the position shown in FIG. 10 to move the carriage 76 outwardly from the topping position (FIG. 9) to an extended or transfer position (FIG. 10). As this occurs, the delimber head 54 is moved clear of an outermost end 106 of the delimbed and topped tree trunk 52. The felling assembly 22 is then operated to deposit the topped and delimbed tree trunk 52 in the bunk 36.

Figures 6, 7:
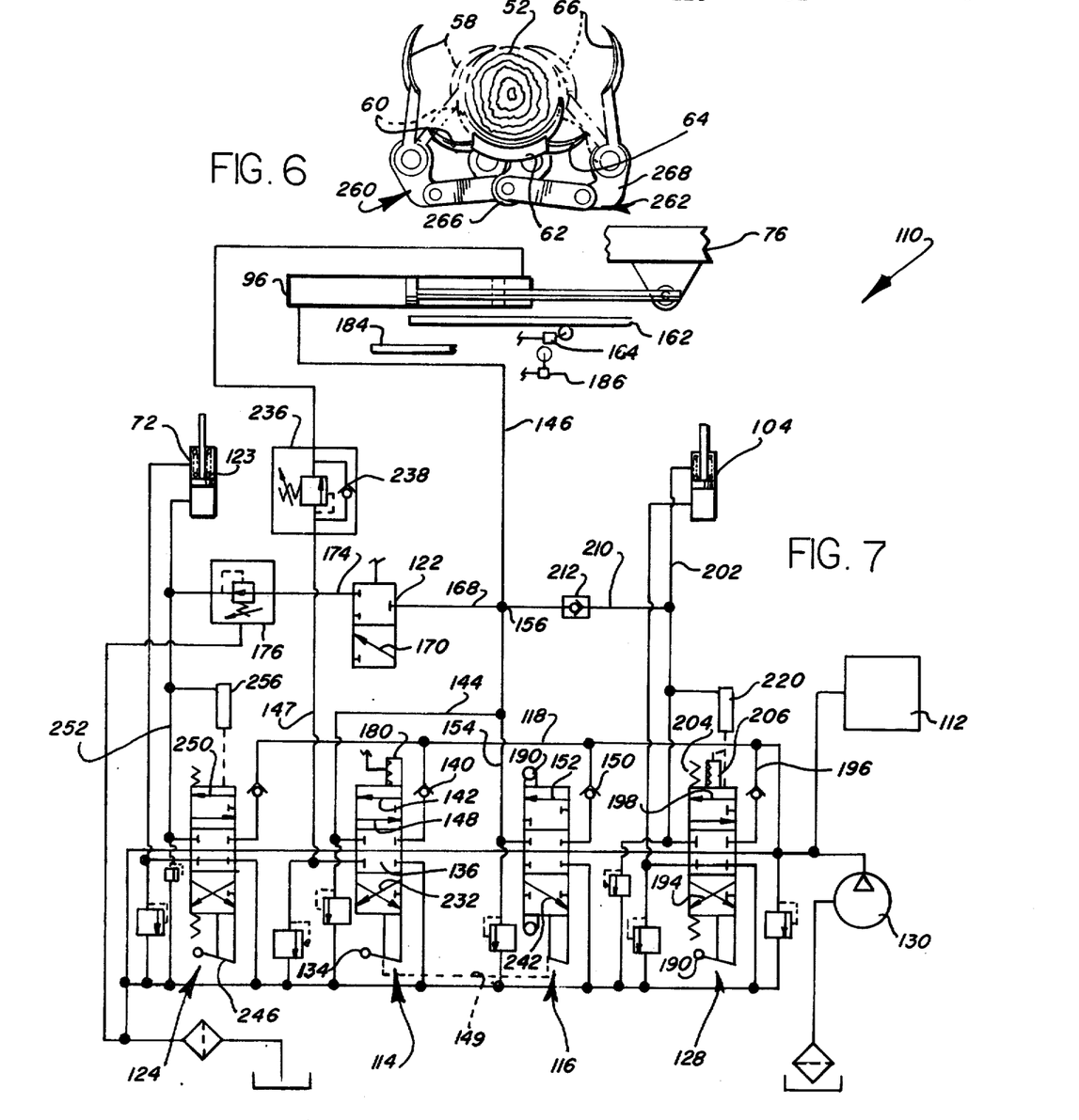
FIG. 6 is an illustration depicting the movement of the delimber blades from an inactive position in which they are spaced apart from the trunk of a tree to an active position in which they are disposed in engagement with the tree trunk.
FIG. 7 is a schematic illustration of an improved control circuitry for effecting operation of the delimber assembly.

A control apparatus 110 for controlling the operation of the delimber assembly 24 is illustrated schematically in FIG. 7. The control apparatus 110 includes controls 112 for effecting operation of the felling assembly 22. In addition, the control apparatus 110 includes a pair of valves 114 and 116 which are actuatable to port fluid from a supply line 118 to effect operation of the carriage drive motor 96. Upon initiation of operation of the carriage drive motor 96, a valve 122 is automatically opened to effect operation of the motor 72 against a biasing spring 123 to move the delimber blades 58, 60, 64 and 66 into engagement with the tree trunk 52. In addition to the automatically actuated valve 122, a manually operable control valve 124 is provided to control the operation of the delimbing blade motor 72. Upon operation of a topping blade control valve 128, the motor 104 is retracted to pivot the topping blades 98 and 100 toward each other from the open condition of FIG. 3 to a closed position to cut off the outer end portion of a delimbed tree trunk. A continuously driven pump 130 supplies fluid to the various control valves and motors.

Figure 1:
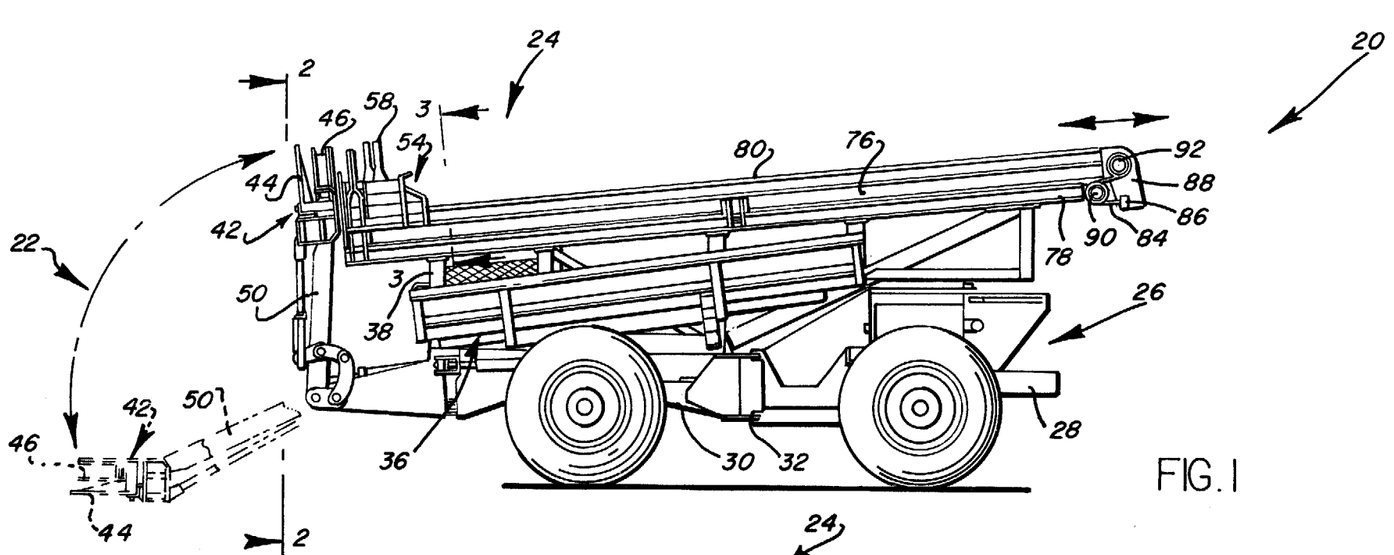
FIG. 1 is an elevational view of a tree harvesting apparatus constructed in accordance with the present invention and including a felling assembly which is operable to sever the trunk of a standing tree and position the tree trunk in a delimber assembly.
Figure 2:
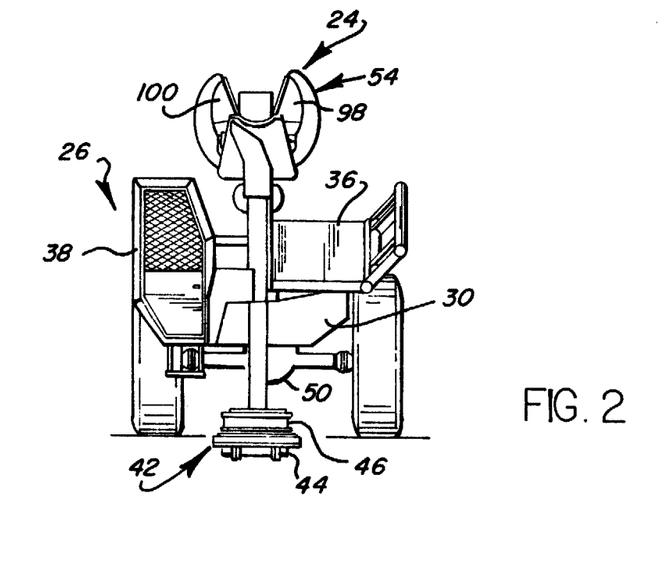
FIG. 2 is an elevational view, taken generally along the line 2—2 of FIG. 1, illustrating the relationship between the felling and delimber assemblies when the fellig assembly is positioned to engage the trunk of a standing tree.
Figure 8:
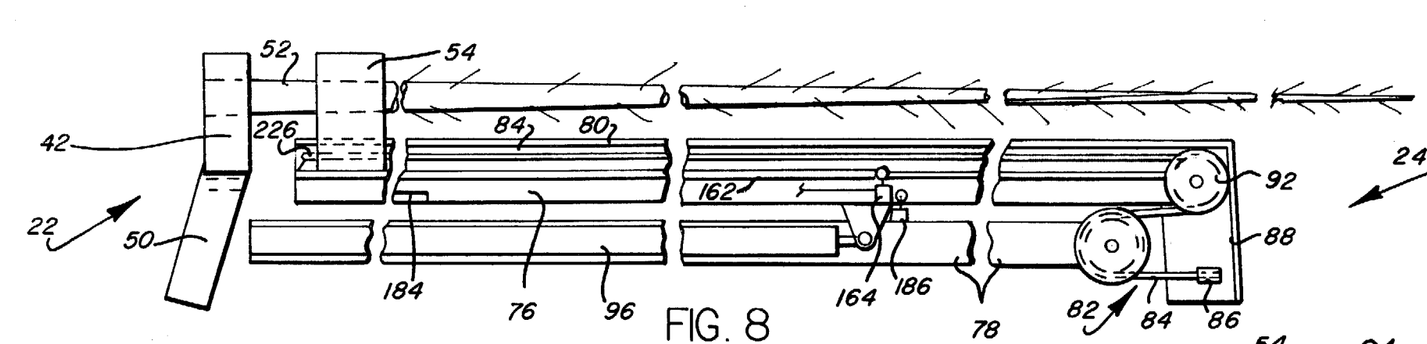
FIG. 8 is a schematic illustration depicting the relationship between the delimber head, carriage, and boom when the delimber head is in an initial position engaging the tree trunk.

Upon operation of the felling assembly 22 to position a felled tree trunk in the delimber assembly 24, the delimber head 54, carriage 76, and drive motor 96 are fully retracted (FIGS. 1 and 8). In addition, the delimber blade motor 72 is retracted so that the delimber blades are in the inactive condition illustrated in solid lines in FIG. 6. At this time the topping blade motor 104 is fully extended so that the blades 98 and 100 are open as shown in FIG. 3.

To initiate operation of the delimber assembly 24 to delimb the felled tree trunk 52 while it is held against movement by the felling assembly 22, a control handle 134 of the valve 114 is pivoted in a counterclockwise direction (as viewed in FIG. 7) to shift a valve spool 136 downwardly (as viewed in FIG. 7). This ports fluid from the supply line 118 through a check valve 140 and valve passage 142 to a conduit 114 connected in fluid communication with a conduit 146 leading to the head end of the carriage drive motor 96. The rod end of the motor 96 is connected with drain or reservoir through conduit 147 and passage 148 in the actuated valve spool 136.

To effect a rapid delimbing of the tree trunk 52, a second control valve 116 is actuated by a linkage 149 upon actuation of the control valve 114. Actuation of the valve 116 ports fluid from the main supply line 118 through a check valve 150 and valve passage 152 to a conduit 154 connected at 156 with the conduit 146. Thus, actuation of the valve 116 substantially increases the rate of fluid flow to the head end of the carriage drive motor 96. Of course, this increases the rate at which the motor 96 is extended and the speed of movement of the delimber head 54 along the tree trunk 52. It should be understood that the conduit 147 and valve passage 148 are capable of transmitting the resulting increase in fluid flow from the motor 96 to drain.

Upon initiation of operation of the carriage drive motor 96, the motor 72 is operated to move the delimbing blades 58, 60, 64, and 66 into engagement with the tree trunk. Thus upon initial operation of the motor 96, an elongated cam 162 operates an actuator 164 to shift the valve 122 upwardly (as viewed in FIG. 7). This movement of the valve 122 ports fluid under the pressure from a supply line 168 connected with the conduit 146 through a valve passage 170 to a conduit 174 connected through a pressure reducing valve assembly 176 with the head end of the motor 72. The resulting flow causes the motor 72 to be extended from the position shown in FIG. 3 to simultaneously pivot the movable delimbing blades 58, 60, 64, and 66 into abutting engagement with the tree trunk 52. The pressure reducing valve assembly 176 limits the fluid pressure transmitted to the motor 72 to thereby limit the force with which the delimbing blades 58, 60, 64, and 66 are urged inwardly against the tree trunk 52.

The motor 96 is extended to move the carriage 76 outwardly from the initial position of FIG. 8 to the topping position of FIG. 9. As this occurs, the delimber head 54 is moved outwardly along the trunk 52 and the delimbing blades 58, 60, 62 64, and 66 strip or break the limbs off of the tree trunk in a known manner. It should be noted that the delimber head 54 is moved outwardly under the combined influence of outward movement of the carriage 76 and operation of the delimber drive arrangement 82 to move the delimber head 54 outwardly along the carriage 76 simultaneously with outward movement of the carriage. However, it is contemplated that the delimber head 54 could, if desired, be fixedly mounted on the carriage 76 and moved outwardly only under the influence of the carriage drive motor 96.

During outward movement of the carriage 76, the control valve 114 is held in the actuated position by a detent assembly 180 (see FIG. 7). When the carriage 76 reaches the topping position (FIG. 9), a cam 184 mounted on the carriage 76 operates an actuator 186 which is mounted in a fixed relationship with a boom 78. Operation of the actuator 186 by the cam 184 (see FIG. 9) causes the detent assembly 180 (FIG. 7) to be released by a suitable linkage (not shown). When the detent assembly 180 is released, a biasing spring returns the control valves 114 and 116 to their neutral positions blocking fluid flow to and from the carriage drive motor 96. The linkage 149 interconnects the valves 114 and 116 so that the valve 116 is moved back to its neutral position simultaneously with the valve 114 upon a releasing of the detent assembly 180. Of course, when the valves 114 and 116 have been moved to their neutral positions blocking fluid flow to and from the carriage drive motor 96, the carriage 76 and delimber head 54 are hydraulically locked in the topping position of FIG. 9.

Once the tree trunk 52 has been delimbed and the delimber head 54 moved to the topping position of FIG. 9, the control valve 128 is actuated to activate the motor 104 and pivot the topping blades 98 and 100 from the open position of FIG. 3 to a closed position to cut off or top the outer end of the tree trunk. The valve 128 is operated by pivoting a control handle 190 in counterclockwise direction (as viewed in FIG. 7). This shifts a valve spool 194 downwardly (as viewed in FIG. 7) so that high pressure fluid is conducted from the supply line 118 through a conduit 196 and valve passage 198 to a conduit 202 leading to the rod end of the motor 104. This causes the motor 104 to be retracted to thereby pivot the topping blades 98 and 100 toward the closed position. It should be noted that the valve spool 194 is held in the actuated position against the influence of a biasing spring 204 by a suitable detent assembly 206. However, the detent assembly 206 could be omitted if desired.

In accordance with a feature of the present invention, the carriage drive motor 96 is automatically activated upon topping of the tree trunk 52 to move the delimber head 54 clear of the topped and delimbed tree trunk. Thus, the conduit 202 leading to the rod end of the motor 104 is connected by conduit 210 through a check valve 212 to the conduit 146 leading to the head of the carriage drive motor 96. Therefore, when the valve 128 is activated to effect a topping of a tree trunk, the fluid pressure in the line 202 is communicated to the conduit 146. However, since the line 146 contains fluid at a substantial pressure due to the previous operation of the carriage drive motor 96, upon initial operation of the valve 128, the fluid pressure in the conduit 202 does not exceed the pressure in the conduit 146. However, the pressure in the conduit is sufficient to move the topping blades into engagement with the outer end of the tree trunk. As the pressure in the conduit 202 and motor 104 builds up, the topping blades are pressed into the tree trunk 52. However, by the time the pressure in the conduit 202 is increased to a value which is as great as the pressure in the conduit 146, the topping blades 98 and 100 have penetrated a substantial distance into the tree trunk 152. Due to this penetration of the blades 98 and 100, the carriage drive motor 96 is ineffective to move the carriage 76 until the tree trunk 52 has been completely cut off or severed by the topping blades 98 and 100.

As the tree trunk 52 is severed or cut off by the topping blades 98 and 100, the delimber head 54 is released for outward movement under the influence of the carriage drive motor 96. At this time, the carriage drive motor 96 automatically effects outward movement of the carriage 76 and delimber head 54 under the influence of the fluid pressure conducted from the conduit 202 to the head end of the carriage drive motor 96 through the conduits 210 and 146. Therefore, upon completion of a topping operation, the carriage drive motor 96 is automatically operated to move the carriage 76 to the extended position of FIG. 10 in which the delimber head 54 is clear of the outer end 106 of the tree trunk 52. This enables the tree trunk to be deposited in the bunk 36 by the felling assembly 22 without interferring with the delimber head 54.

When the carriage 76 and delimber head 54 have been moved from the topping position of FIG. 9 to the extended or transfer position of FIG. 10, the detent assembly 206 for the valve 128 (see FIG. 7) is released so that biasing springs 204 return the valve 128 to its neutral position. Thus, when the topping blades 98 and 100 have been closed by operation of the motor 104 to its fully extended condition and the carriage 76 moved to the transfer position of FIG. 10 by operation of the carriage drive motor 96 to its fully extended condition, the fluid pressure in the line 202 increases to a value which is substantially equal to the fluid pressure in the supply conduit 118. When this occurs, a pressure activated valve kick-out or return device 220, of known construction, is effective to release the detent assembly 206 and to move the valve spool 194 back to the neutral position of FIG. 7. This blocks fluid flow to and from the carriage drive motor 96 and the shear blade motor 104. The topped and delimbed tree trunk 52 is then moved into the bunk 36 by operation of the felling assembly 22 in a known manner.

To return the delimber head 54 from the extended or transfer position of FIG. 10 to the initial position of FIG. 8, the control valve 114 is operated to port fluid under pressure to the rod end of the carriage drive motor 96. This causes the carriage drive motor 96 to be retracted to move the carriage 76 from the extended position to the initial position. As this occurs, a delimber head return cable 226 (see FIG. 5) causes the delimber head 54 to be moved inwardly along the carriage 76.

The delimber head return cable 226 is fixedly connected at one end to the delimber head 54, extends around a pulley or sheave 228 mounted on the carriage 76 and a pulley 229 on the boom 78. The end of the cable 226 is fixedly connected with the carriage 76 at a connection 231. Therefore, upon retraction of the carriage drive motor 96, the delimber head return cable 226 pulls the delimber head 54 inwardly; that is, toward the left as viewed in FIGS. 5 and 10. When the carriage drive motor 96 is in the fully retracted position of FIG. 8, the delimber head return cable 226 will have pulled the delimber head back to the initial position shown in FIG. 8. Instead of being connected as shown, the return cable 226 could extend between the delimber head 54 and the rod end of the motor 96 if desired.

During return movement of the carriage 76 and delimber head 54, the drive motor 96 is retracted at a relatively slow speed. This is to prevent the use of excessive fluid by the delimber drive motor 96 with a resulting shortage in fluid pressure for other operating functions which, during retraction of the delimber assembly 24, are more important to operation of the harvesting apparatus 20. Thus, when the control valve 114 is actuated to effect a retraction of the carriage drive motor 96, fluid under pressure flows from the supply conduit 118 through a valve passage 232 to the conduit 147 leading to a pressure reducing check valve assembly 236. The pressure reducing check valve assembly 236 limits the fluid pressure conducted to the rod end of the carriage drive motor 96 as it is retracted. However, the pressure reducing check valve assembly 236 is effective to enable fluid to flow freely from the rod end of the carriage drive motor 96 through a check valve 238 as the carriage drive motor 96 is extended to move the carriage 76 quickly outwardly during the delimbing of a tree trunk 52.

During retraction of the delimber motor drive 96, the valve 116 is ineffective to direct fluid under pressure to the rod end of the motor. The valve 116 is actuated by the linkage 149 upon operation of valve 114 to retract the delimber drive motor 96. However, the valve 116 merely connects the conduit 146 with drain through a valve passage 242. In addition, the pressure reducing and check valve assembly 236 is effective to limit the pressure transmitted to the rod end of the delimber drive motor 96 to a relatively low value. This enables the pump 130 to supply ample fluid to perform other functions during retraction of the delimber drive motor 96.

When the carriage 76 is moved from the extended position of FIG. 10 back toward the retracted position of FIG. 8, the delimber blades 58, 60, 64 and 66 are automatically moved away from the delimbed tree trunk. Thus, when the valve 114 is actuated to connect the conduit 147 and rod end of the motor 96 with the fluid supply line 118, the conduit 146 and head end of the motor 96 are connected with drain. The resulting low pressure in the conduit 146 is communicated through the actuated valve 122 and pressure reducing valve 176 to the motor 72. The reduction in pressure at the head end of the motor 72 enables the biasing spring 123 to retract the motor. As the motor 72 is retracted, the delimbing blades 58, 60, 64 and 66 are returned to their inactive conditions.

Under certain operating conditions it is contemplated that it will be desirable to move the delimbing blades 58, 60, 64, and 66 from the inactive condition (illustrated in solid lines in FIG. 6) to the active condition independently with initiation of operation of the delimber drive motor 96 and the resulting actuation of the valve 122 by the actuator assembly 164. Accordingly, upon counterclockwise rotation (as viewed in FIG. 7) of actuator handle 246, the valve 124 is operated to port fluid under pressure through a passage 250 and conduit 252 to the delimber blade motor 72. Operation of the delimber blade motor 72 moves the delimber blades 58, 60, 64, and 66 inwardly into engagement with the tree trunk 52. When the delimber blades have engaged the tree trunk 52, a relatively high pressure will be present in the conduit 252. This relatively high pressure causes a valve kick-out or actuating device 256 to operate the valve 124 back to the neutral condition. The pressure responsive kick-out device 256 frunctions to limit the pressure which is applied by the delimber blades 58, 60, 64 and 66 against the tree trunk 52.

A single motor 72 is utilized to move four delimber blades 58, 60, 64, and 66 between the inactive condition (illustrated in solid lines in FIG. 6) and the active condition (illustrated in dashed lines). Thus, the delimber blades 58 and 60 are connected with one end portion, for instance the head end portion, of the motor 72 by a linkage assembly 260. Similarly, the opposite delimber blades 64 and 66 are connected with the opposite end portion, for example the rod end portion, of the motor 72 by a linkage 262. The linkage 262 includes a link 264 which is pivotally connected at its opposite ends with valve crank arms 266 and 268 which are fixedly connected with the delimber blades 64 and 66 in the manner illustrated in FIG. 3.

Upon operation of the motor 72 from the retracted condition of FIG. 3 to an extended condition, the link 264 is moved toward the right (as viewed in FIG. 3) to pivot the crank arms 266 and 268 about pivot connections 270 and 272. This moves the delimber blades 64 and 66 from the inactive condition of FIG. 3 to the active condition illustrated in dashed lines in FIG. 6. Simultaneously with the movement of the delimber blades 64 and 66 from the inactive condition to the active condition, the linkage 260 is activated to move the delimber blades 58 and 60 to the active condition. It should be understood that the linkage assembly 260 is of the same construction as the linkage 262 and that both linkage assemblies are activated by an extension of the piston and cylinder type motor 72 which is connected at its opposite end portions with the two linkages. This enables a single motor assembly 72 to be utilized to operate both of the linkages and pivot all four delimber blades to their active conditions.

In view of the foregoing description, it can be seen that the tree harvesting apparatus 20 includes a delimber assembly 24 which is relatively easy to operate. This is because the hydraulic controls 110 automatically effect operation of the delimbing blades 56, 60, 64, and 66 into engagement with the trunk 52 of a tree upon initiation of outward movement of the delimber carriage 76 and delimber head assembly 54. When the delimber carriage 76 has been moved to the topping position of FIG. 9, topping blades 98 and 100 are moved inwardly under the influence of the motor 104 to cut off or top the outer end portion of the tree trunk 52. The delimber drive motor 96 is then automatically activated to move the carriage 76 and delimber head 54 outwardly from the topping position to the extended or transfer position of FIG. 10 in which the delimber head 54 is clear of the topped and delimbed tree trunk 52. The cost of fabricating the delimber head assembly 54 tends to be reduced by the use of the single motor 72 to move all four of the delimber blades 58, 60, 64, and 66 to the active condition in engagement with the tree trunk upon initiation of outward movement of the carriage 76 and delimber head assembly 54 from the initial position of FIG. 8 to the topping position of FIG. 9.

Although a specific fluid control system 110 has been illustrated in FIG. 7, it should be understood that the control arrangement has been simplified somewhat to avoid unnecessary prolixity of description. In addition, it is contemplated that the control arrangement may be varied substantially from the control arrangement described herein. It is also contemplated that the specific construction of the felling head 42 and delimber head 54 may be varied from the construction described.

I claim:

1. An apparatus for use in harvesting trees, said apparatus comprising a base, a longitudinally extending boom connected with said base, a carriage mounted for outward movement along said boom from an initial position to a topping position and from said topping position to an extended position, delimber means mounted on said carriage for delimbing the trunk of a tree during outward movement of said carriage along said boom from said initial position to said topping position, shear means mounted on said carriage for cutting off a top portion of the trunk of a tree when said carriage is stopped in said topping position, drive means for moving said carriage outwardly along said boom from said initial position to said topping position to enable said delimber means to delimb the trunk of a tree and for moving said carriage outwardly from said topping position to said extended position to move said carriage outwardly of the outer end of a delimbed and topped tree trunk, first control means including manually actuatable means for initiating operation of said drive means to move said carriage from said initial position to said topping position, and second control means for automatically re-initiating operation of said drive means independent of said first control means to move said carriage outwardly from said topping position to said extended position in response to operation of said shear means to cut off the top portion of a delimbed tree trunk.

2. An apparatus as set forth in claim 1 wherein said delimber means includes a plurality of delimber blades movable from an open condition spaced apart from the trunk of a tree to a closed position adjacent to the trunk of a tree, motor means for effecting movement of said delimber blades from the open condition to the closed condition in response to initiation of movement of said carriage from said initial position toward said topping position.

3. An apparatus as set forth in claim 2 wherein said second motor means includes a piston and cylinder assembly operable between an extended condition and a retracted condition to effect movement of said plurality of delimber blades between said open and closed conditions.

4. An apparatus as set forth in claim 1 further including felling head means for clamping and severing the trunk of a standing tree, and boom means for moving said felling head means to position a clamped and severed tree trunk in said delimber means, and bunk means for receiving delimbed tree trunks, said control means including means for effecting operation of said felling head means to deposit a delimbed and topped tree trunk in said bunk means with said carriage in said extended position.

5. An apparatus as set forth in claim 1 wherein said first control means includes position responsive means for interrupting operation of said drive means and movement of said carriage in response to movement of said carriage to said topping position.

6. An apparatus as set forth in claim 1 wherein said carriage includes a longitudinally extending guide track having inner and outer end portions, said delimber means being movable between said inner and outer end portions of said guide track, and means for effecting movement of said delimber means along said guide track simultaneously with movement of said carriage along said boom.

7. An apparatus as set forth in claim 6 wherein said delimber means is disposed inwardly of an outer end of said guide track when said carriage is in said topping position and is disposed adjacent to the outer end of said guide track when said carriage is in said extended position.

8. An apparatus as set forth in claim 1 wherein said drive means includes fluid motor means operable between a retracted condition and an extended condition to effect movement of said carriage between said initial, topping and extended positions, and valve means for effecting operation of said fluid motor means from the retracted condition to the extended condition at a first speed to effect rapid movement of said carriage from the initial position to the topping position and the rapid delimbing of a tree trunk and for effecting operation of said fluid motor means from the extended condition to the retracted condition at a second speed which is slower than said first speed to effect a relatively slow movement of said carriage from said extended position to said initial position.

9. An apparatus as set forth in claim 1, in which said drive means includes first fluid motor means operatively connected to said carriage, said shear means includes second fluid motor means operatively connected to blade members of said shear means, said apparatus also including a source of fluid power; characterized by first fluid circuit means connecting said first fluid motor means to said source of fluid power through said manually actuatable means, said fluid circuit means connecting said second fluid motor means with said source of fluid power, and means interconnecting said first and second fluid circuit means to enable said drive means to be operated through said second circuit means bypassing said manually actuatable means.

* * * * *

UNITED STATES PATENT AND TRADEMARK OFFICE
CERTIFICATE OF CORRECTION

PATENT NO. : 3,894,568
DATED : July 15, 1975
INVENTOR(S) : Robert H. Windsor

It is certified that error appears in the above-identified patent and that said Letters Patent are hereby corrected as shown below:

Col. 10, line 60: After the comma (,), "said" should read ---second---.

Signed and Sealed this thirtieth Day of September 1975

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,894,568
DATED : July 15, 1975
INVENTOR(S) : ROBERT N. WINDSOR

It is certified that error appears in the above-identified patent and that said Letters Patent are hereby corrected as shown below:

Inventor's middle initial as shown is incorrect -

Should read: ROBERT N. WINDSOR

Signed and Sealed this fourth Day of November 1975

[SEAL]

Attest:

RUTH C. MASON
Attesting Officer

C. MARSHALL DANN
Commissioner of Patents and Trademarks